April 17, 1934.    J. J. INGELS    1,955,546
METHOD OF MAKING CLEATS
Original Filed Dec. 17, 1930    3 Sheets-Sheet 1
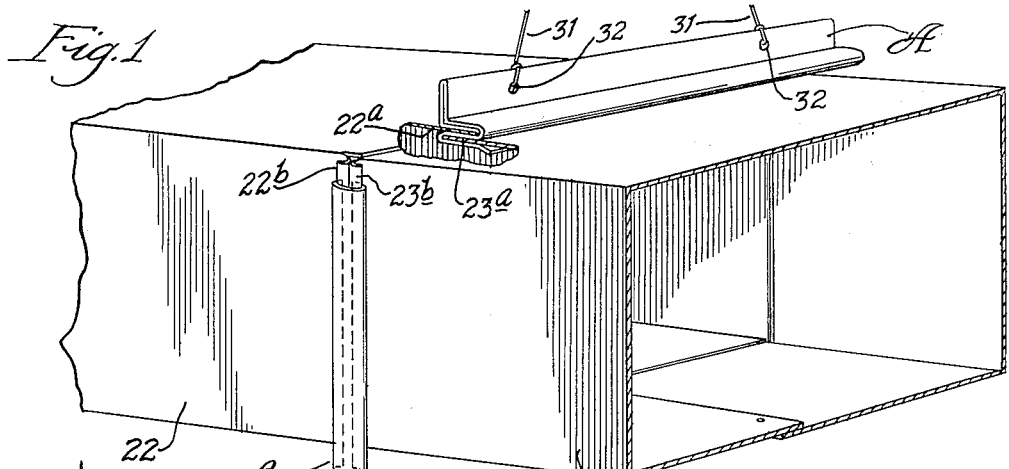
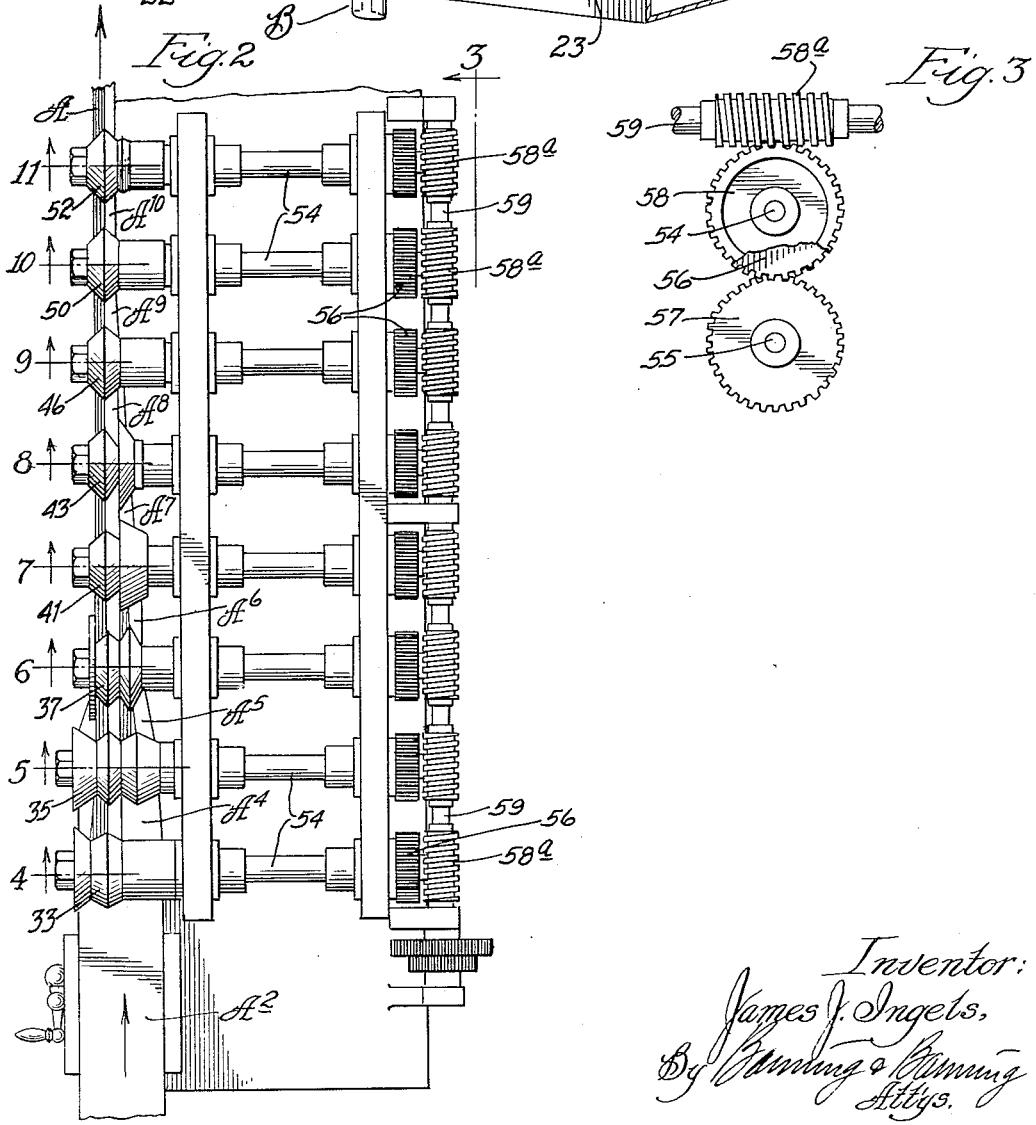
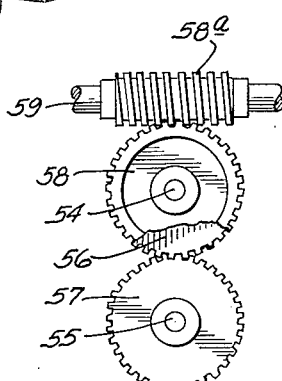
Inventor:
James J. Ingels, April 17, 1934.  J. J. INGELS  1,955,546
METHOD OF MAKING CLEATS
Original Filed Dec. 17, 1930  3 Sheets-Sheet 2
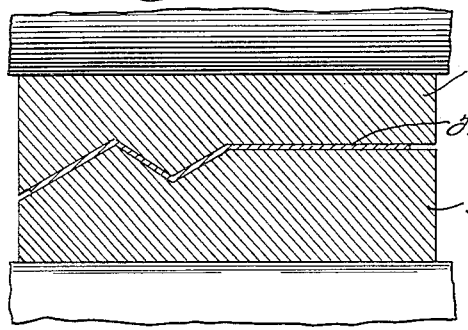
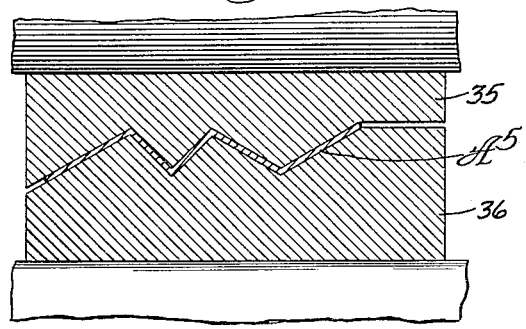
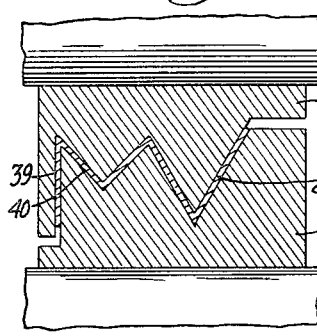
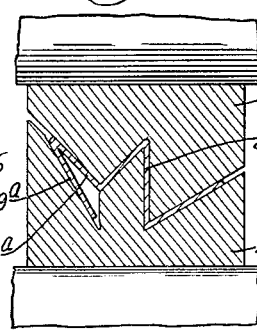
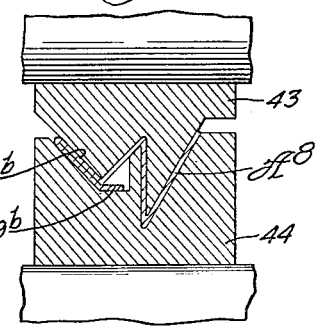
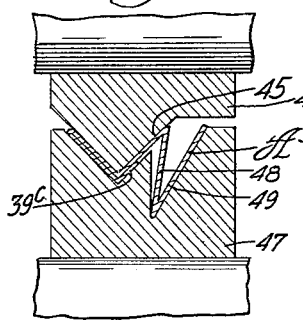
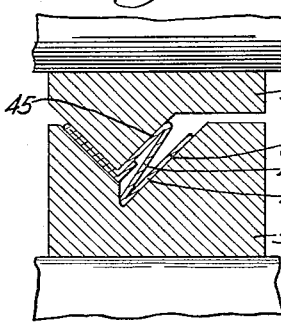
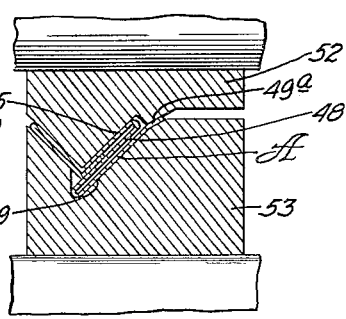
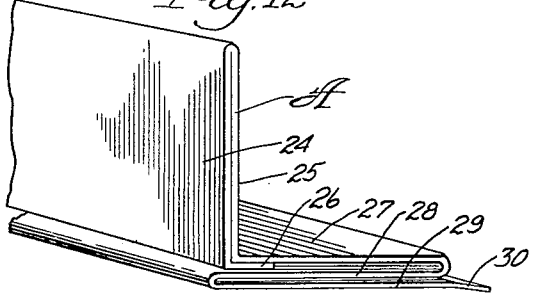
Inventor:
James J. Ingels,
By Banning & Banning
Attys April 17, 1934. J. J. INGELS 1,955,546
METHOD OF MAKING CLEATS
Original Filed Dec. 17, 1930    3 Sheets-Sheet 3
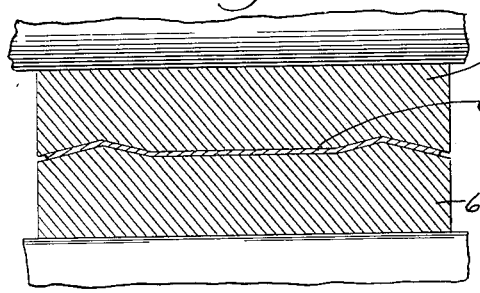
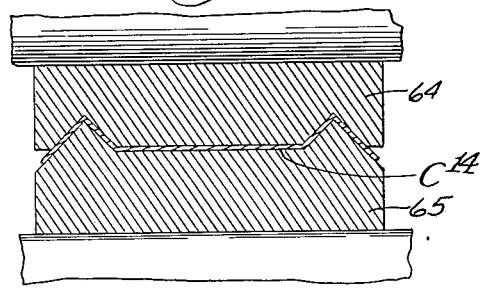
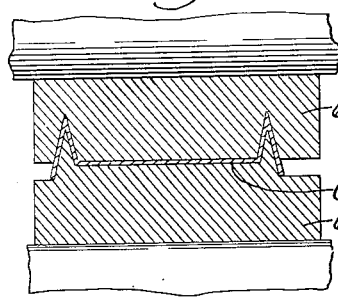
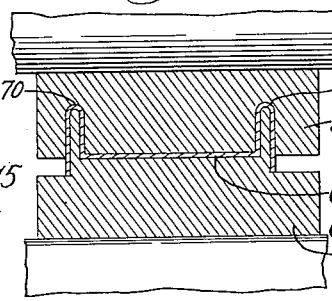
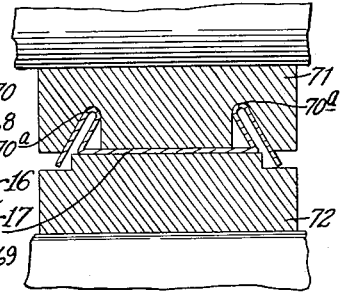
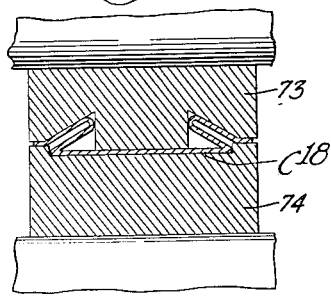
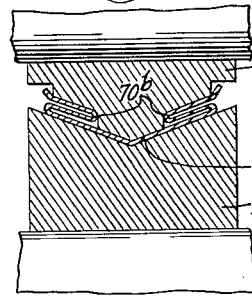
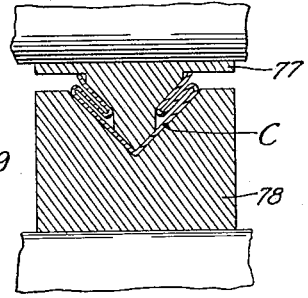
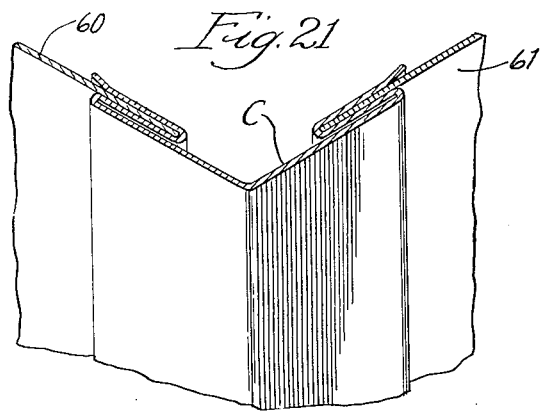
Inventor:
James J. Ingels,
By Banning & Banning
Attys.

Patented Apr. 17, 1934

1,955,546

UNITED STATES PATENT OFFICE 1,955,546

METHOD OF MAKING CLEATS

James J. Ingels, Chicago, Ill.

Application December 17, 1930, Serial No. 502,889
Renewed September 13, 1933

10 Claims. (Cl. 153—28)

An object of this invention is to provide a new and improved method of making cleats for use in sheet metal work.

This and other objects, as will hereinafter appear, are accomplished by this invention which is fully described in the following specification and shown in the accompanying drawings, in which—

Figure 1 is a perspective view of two pipe sections joined by means of cleats, one of which is a subject of the present invention;

Fig. 2 is a partial top plan view showing the location and arrangement of rolls for forming the cleat;

Fig. 3 is a partial enlarged vertical elevation on the line 3 of Fig. 2;

Figs. 4 to 11 inclusive are enlarged sections of the meeting edges of pairs of rolls as taken on the section lines 4 to 11 respectively of Fig. 2;

Fig. 12 is an enlarged perspective view of the finished cleat formed by the rolls of Figs. 4 to 11;

Figs. 13 to 20 inclusive are enlarged sections of the meeting edges of another set of rolls for forming another cleat section; and Fig. 21 is an enlarged perspective view of a finished cleat formed by rolls 13 to 20.

In Fig. 1 is shown the cleat A which is adapted to be used to form a junction of two pieces of ventilating pipe or the like 22, 23. A cleat similar to A is used on the bottom meeting edges of these two pieces of pipe, and two flat C-shaped cleats B are used one on each side, only one, however, being shown. The cleat A is shown in Fig. 12, and comprises a marginal portion 24, a narrower next adjacent portion 25 which is bent closely parallel thereto, but the outer edge 26 of the marginal portion 24 being bent around and under the portion 25. The portion 25 is continued as a middle portion 27, which is preferably bent substantially at right angles thereto. The middle portion 27, together with the portions 28, 29, which are bent back and forth so as to form a flat S-shaped section, terminate in a slightly outward flared margin 30.

Referring now to Fig. 1, it will be observed that the upper portions of the pipes 22 and 23 have overlapping edges 22$^a$ and 23$^a$ respectively, which are adapted to be inserted in the cleat A, the edge 22$^a$ lying between the portions 27, 28, and the edge 23$^a$ lying between the portions 28, 29. The sides of the pipes 22 and 23 have bent back edges 22$^b$ and 23$^b$ respectively, which are adapted to be enclosed by means of a flat C-shaped cleat B, which is slid endwise thereover so as to retain them. Thus it will be seen that when a cleat similar to A is placed on the bottom of the pipes, and a cleat similar to B is placed on the opposite side of the pipes, they will be securely locked together, and the joint will be sufficiently tight for purposes of ventilation and the like. These pipes are then frequently suspended by means of wires 31 which pass through suitable openings 32 in the cleat A.

The cleat A is formed from a single strip usually of sheet metal A$^2$ which is fed through the machine, as shown in Fig. 2. It first passes through the rolls 33, 34 which causes the strip to take the form A$^4$ of Fig. 4. It then passes on to the next set of rolls 35, 36 wherein the grooves of the form A$^4$ are deepened, and the flat portion of the form A$^4$ is also grooved so as to form five flat portions of the strip. As the strip passes on to the rolls 37, 38 of Fig. 6, it assumes the form A$^6$ in which the grooves are deepened, and the left-hand marginal portion 39 is bent substantially at right angles to the axis of rolls 37, 38. The marginal portion 39 is wider than the next adjacent portion 40, and in Fig. 7 the marginal portion 39$^a$ in passing between the rolls 41, 42 is bent inwardly almost into contact with the next adjacent portion 40$^a$, and the strip A$^7$ is still further bent so as to bring the three right-hand portions closer together.

In Fig. 8, the strip assumes the shape A$^8$ as it passes through between the rolls 43, 44 with the overhanging portion 39$^b$ of the marginal strip which overhangs the adjacent portion 40$^b$ bent partly around the same, and the three right-hand portions closed still more. In Fig. 9, the end 39$^c$ is bent tightly into contact with the middle portion 45 as the strip passes through between the rolls 46, 47, and the two right-hand portions 48, 49 of the strip A$^9$ are closed in still more.

In Fig. 10, the strip A$^{10}$ has the two right-hand portions 48, 49 closed down still more as it passes through between the rolls 50, 51. In Fig. 11, the strip A is complete as it passes through between the rolls 52, 53, as shown in Fig. 12, with the central portion 45 and the right-hand portions 48, 49 substantially closed so as to form a very flat letter S with the portion 48 substantially in contact with the bent back portion 39$^c$. The overhanging edge 49$^a$ of the right-hand portion 49 is flared outwardly by the rolls so as to make it easier to insert a sheet therebetween.

All the rolls of Fig. 2, shown in section in Figs. 4 to 11 inclusive are carried on shafts 54, 55 on which are keyed meshing spur gears 56, 57, and the upper shaft, as 54, of each pair has keyed thereon a worm wheel 58 which meshes with a worm 58$^a$ on a shaft 59. All these worms and worm wheels are of the same size so that all the rolls and shafts are driven at the same speed. Thus it will be seen that a very efficient cleat is provided, as shown in Figs. 1 and 12, and also a very simple and efficient means for forming the same is provided.

Referring now to Figs. 13 to 21 inclusive, the cleat C (Fig. 21) is useful for holding two sheets of metal as 60, 61. This it does by means of a very flat reverse or S-shaped bend in the marginal edges of the cleat, the center being bent to form a substantially 90° angle. It will be understood, however, that angles other than 90° may be used, if desired.

Referring now to Fig. 13, a flat strip of metal or the like is fed to the first set of rolls 62, 63 which slightly corrugate one or both of the marginal edges so as to form the strip $C^{13}$. As it passes to the next set of rolls 64, 65, these grooved or corrugated edges are more deeply indented, as shown at $C^{14}$, and this indenting is continued by the rolls 66, 67 of Fig. 15, thereby forming the strip $C^{15}$. Up to this point the grooves are angular in form, but as they pass through the rolls 68, 69 (Fig. 16) these grooved portions become rounded and flattened at 70, thereby forming the strip $C^{16}$.

In Fig. 17, the rolls 71, 72 are shown bending the rounded portions $70^a$ inwardly so as to bring them more nearly in line with the flat central portion of the strip $C^{17}$. This is still further continued by the rolls 73, 74 of Fig. 18, and as the strip passes out from these rolls it has the form $C^{18}$. In Fig. 19, the rolls 75, 76 have still further bent to rounded and grooved portions $70^b$ so that they now assume the position of a flat S-shape, and at the same time the strip $C^{19}$ is bent near its middle so as to groove it longitudinally. This center bending is completed by the rolls 77, 78 so that the sides of strip C now stand substantially at right angles to each other, and the strip or cleat of Fig. 21 is completely formed.

From the foregoing it will be observed that a very novel and useful form of corner bracket is provided, and one which by the above method can be manufactured in a simple and efficient manner.

While I have described and shown but a few embodiments of my invention, it is to be understood that it is capable of many modifications. Changes, therefore, in the construction and arrangement may be made which do not depart from the spirit and scope of the invention as disclosed in the appended claims.

I claim:

1. The method of forming a cleat from a strip comprising passing a strip endwise through a series of rolls thereby forming a series of longitudinal grooves therein, bending a marginal portion parallel to a narrower next adjacent portion, bending the overhanging edge of the marginal portion around under said adjacent portion, and bending other portions of the strip so as to cause them to overlie the bent overhanging edge.

2. The method of forming a cleat from a strip comprising passing a strip endwise through a series of rolls thereby forming a series of longitudinal grooves therein, bending a marginal portion parallel to a narrower next adjacent portion, bending the overhanging edge of the marginal portion around under said adjacent portion, and bending other portions of the strip so as to cause them to overlie the bent overhanging edge, said other portions and third portion being bent back and forth to form a flat S so as to receive therein the ends of adjacent sheets.

3. The method of forming a cleat from a strip comprising passing a strip endwise through a series of rolls thereby forming a series of longitudinal grooves therein, bending a marginal portion parallel to a narrower next adjacent portion, bending the overhanging edge of the marginal portion around under said adjacent portion, and bending other portions of the strip so as to cause them to overlie the bent overhanging edge, the marginal and next adjacent portions being substantially at right angles to the other portions.

4. The method of forming a cleat from a strip comprising passing a strip endwise through a series of rolls thereby forming a series of longitudinal grooves therein, bending a marginal portion parallel to a next adjacent portion, and bending other portions of the strip so as to cause them to lie at right angles to the two parallel portions.

5. The method of forming a cleat from a strip comprising passing a strip endwise through a series of rolls thereby forming a series of longitudinal grooves therein, bending adjacent marginal portions into overlying parallel relationship, and bending the marginal parallel portions so as to cause them to assume a position substantially at right angles to each other.

6. The method of forming a cleat by rolls from a strip comprising forming a longitudinal V-shaped groove along one side, narrowing this groove, forming it into the shape of a narrow V, and folding this V-shaped grooved portion over so as to lie parallel to the adjacent portion.

7. The method of forming a cleat by rolls from a strip comprising forming a longitudinal V-shaped groove along one side, narrowing this groove, forming it into the shape of a narrow V, and forming a similar but reversely folded V-shaped portion on the opposite side of the strip.

8. The method of forming a cleat by rolls from a strip comprising forming a longitudinal V-shaped groove along one side, narrowing this groove, forming it into the shape of a narrow V, forming a similar but reversely folded V-shaped portion on the opposite side of the strip, and bending the strip along a longitudinal line intermediate the V-shaped portions.

9. The method of forming an L-shaped cleat from a strip comprising passing a strip endwise through a series of rolls thereby forming a series of longitudinal grooves therein, bending adjacent marginal portions into overlying parallel relationship, and bending the marginal parallel portions so as to cause them to assume a position substantially at right angles to each other, the latter stages of the forming being accomplished with the sides of the L-shaped cleat forming sharp angles with respect to the centers of the rollers.

10. The method of forming an L-shaped cleat by rolls from a strip comprising forming a longitudinal V-shaped groove along one side, narrowing this groove, forming it into the shape of a narrow V, forming a similar but reversely folded V-shaped portion on the opposite side of the strip, and bending the strip along a longitudinal line intermediate the V-shaped portions, the latter stages of the forming being accomplished with the sides of the L-shaped cleat forming sharp angles with respect to the centers of the rollers.

JAMES J. INGELS.